United States Patent Office 3,498,154
Patented Mar. 3, 1970

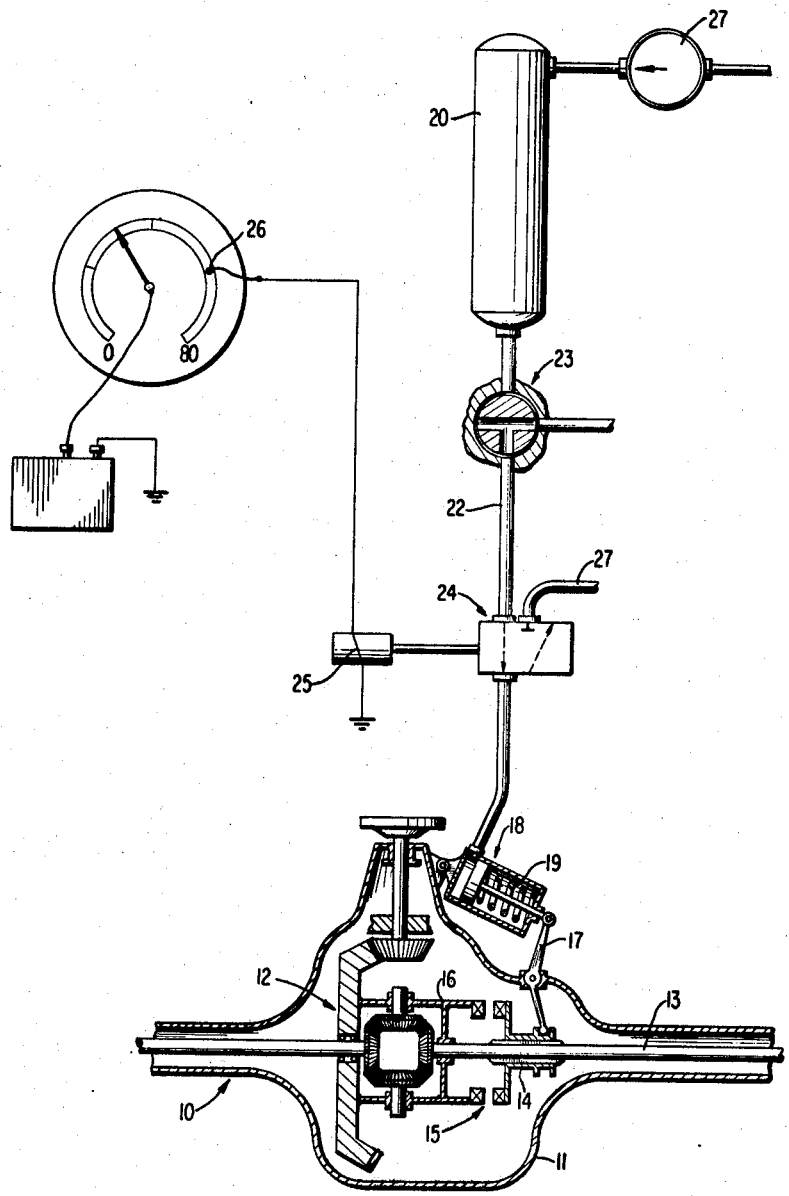

3,498,154
INSTALLATION FOR LOCKING A DIFFERENTIAL GEAR IN VEHICLES, ESPECIALLY MOTOR VEHICLES
Alfred H. Müller-Berner, Waiblingen, Germany, assignor to Daimler-Benz Aktiengesellschaft, Stuttgart-Unterturkheim, Germany
Filed Feb. 29, 1968, Ser. No. 709,358
Claims priority, application Germany, Mar. 3, 1967, D 52,428
Int. Cl. F16h 1/44
U.S. Cl. 74—710.5   6 Claims

ABSTRACT OF THE DISCLOSURE

An installation for locking a differential gear in vehicles in which two elements of the differential gear are adapted to be coupled with each other by means of a clutch that is actuated by a shifting member, and in which the disengagement of the clutch is controlled automatically in dependence on the driving velocity.

BACKGROUND OF THE INVENTION

The present invention relates to an installation for locking a differential gear in vehicles, especially in motor vehicles, whereby two elements of the differential gear are adapted to be coupled or clutched to one another by means of a clutch adapted to be disengaged by means of a shifting device. The present invention has significance for differential gears within an axle and also for those which are arranged between two axles.

With vehicles, which are used more or less frequently on unsurfaced ground, a differential locking mechanism of the aforementioned type is used for the increase of the traction force at the driving axle which is engaged by the driver in case of need. If now, during the passage of the vehicle from the open or unsurfaced terrain to a surfaced road, the re-disengagement of the locking mechanism is forgotten, then this can be extraordinarily disadvantageous. Particularly during curve drives, stresses and high loads then occur in the rear axle gear. Also, the tires of the respective wheels are subjected to an unusually and unnecessarily high wear.

SUMMARY OF THE INVENTION

The present invention aims at avoiding the disadvantages occurring with inexperienced or improper operation of a differential locking mechanism. The underlying problems are solved by the present invention with the installations of the aforementioned type in that the disengaging operation of the clutch is controllable automatically in dependence on the vehicle velocity. The disengaging velocity is thereby so selected that the vehicle velocity customary in open terrain lies with certainty below the same and the velocity customary during road travel lies above the same. For example, the boundary value of 40 km. per hour might be considered.

An automatization of the engaging operation of this clutch is not considered because this would also occur then in case of slower drive on the road. The engagement should, in every case, take place manually, i.e., intentionally and consciously.

In general, the clutches used with such types of differential locking mechanisms are actuated by a pressure medium. The present invention proposes therefor that the clutch is adapted to be disengageable by a spring force and is adapted to be engaged by a pressure medium and that a discharge valve is arranged in the pressure medium supply to the clutch which is adapted to be controlled in dependence on the driving velocity. Air or pressure oil are contemplated primarily as pressure medium. However, it is also feasible, in principle and within the scope of the present invention, to cause the clutch to be engaged as well as disengaged by the pressure medium, i.e., to construct the clutch actuation so as to be double-acting. However, the first-described construction offers the advantage that in case of failure of the pressure medium, the clutch is disengaged with certainty and therewith the vehicle can be made suited for normal road traffic.

The present invention prefers a solution in which a manually actuated control valve and an electromagnetically actuated control valve are arranged in series in the pressure-medium supply to the clutch. In that case, according to a further feature of the present invention, the energizing coil of the electromagnetic control valve is then connected with a current source by way of a contact to be actuated from a tachometer at a predetermined velocity. Naturally, in lieu of the tachometer, also any other device rotating in dependence on the driving velocity may be used.

Accordingly, it is an object of the present invention to provide an installation for blocking a differential gear in vehicles which avoids by simple means the aforementioned shortcomings and drawbacks encountered in the prior art.

Another object of the present invention resides in a locking mechanism for a differential gear which is automatically unlocked once the vehicle exceeds a predetermined speed.

A further object of the present invention resides in a locking mechanism for locking differential gears which avoids excessive tire wear or stress.

These and further objects, features, and advantages of the present invention will become more obvious from the following description when taken in connection with the accompanying drawing which shows, for purposes of illustration only, one embodiment in accordance with the present invention, and wherein:

The single figure is a schematic view of a differential locking mechanism of an axle in accordance with the present invention.

Referring now to the drawing, the axle drive housing 11 is arranged in the usual manner within the axle generally designated by reference numeral 10; the axle drive housing 11 accommodates within the same a conventional differential gear generally designated by reference numeral 12. A shifting sleeve 14 is arranged on the axle half shaft 13 again in a conventional manner so as to be non-rotatable but longitudinally displaceable; a claw clutch generally designated by reference numeral 15 is adapted to be engaged and disengaged with the aid of the shifting sleeve 14. The half axle drive-shaft 13 is rigidly connected with the differential housing 16 by means of this clutch 15. i.e., the differential is locked in a conventional manner.

The actuation of the shifting sleeve 14 takes place in way of a lever 17 from an adjusting motor generally designated by reference numeral 18 which is actuated by a pressure medium. The spring 19 in the adjusting motor 18 always seeks to retain the shifting sleeve 14 in the disengaged position or to move the same into this disengaged position. The adjusting motor 18 is supplied from a pressure medium source 20 of any conventional construction which, in its turn, may be filled in case of need from a pump 21 and is kept at a predetermined minimum pressure.

A manually actuated control valve 23, for example, in the form of a three-way cock or valve and an electromagnetically actuated control valve 24 are arranged in series in the supply line 22 from the pressure tank 20 to the adjusting motor 18. The energizing coil 25 of the electromagnetically actuated control valve 24 is connected with a contact 26 which is disposed at the tachometer.

The contact 26 may be so arranged as to respond, for example, at a tachometer position corresponding to 60 kilometers per hour.

The electromagnetic control valve 24 is normally in the open position illustrated in the drawing. In this position, the adjusting motor 18 may now be acted upon by pressure or be relieved again from the pressure by manual actuation of the control valve 23. The differential locking mechanism, i.e., the clutch 15 is thereby engaged or again disengaged.

If now, for example, the disengagement by shifting the manually operated control valve 23 has been forgotten, then the electromagnetic control valve 24 is energized with current as soon as the contact 26 is reached at the tachometer. The control valve 24 will now be shifted automatically into the other position, and the pressure is relieved from the adjusting motor 18 by way of the discharge line 27. The spring 19 is now capable to displace the shifting sleeve 14 again toward the right and therewith to disengage the clutch 15 acting as differential locking means. It will be appropriate in connection therewith to provide special means in order to prevent a falling back of the electromagnetic control valve 24 when falling below the preselected driving velocity for such length of time as the manually actuated control valve 23 remains in the position which corresponds to the engagement of the differential locking mechanism. This can be achieved by any conventional means known to a person skilled in the art and therefore is not illustrated herein. In some circumstances, this can be also achieved already by a mere warning signal. The driver will then shift the manual control valve 23 when the warning signal lights up.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. An installation for locking a differential gear in vehicles, especially in motor vehicles in which two elements of the differential gear are adapted to be connected with each other by a disengageable clutch means, wherein the improvement comprises control means for automatically controlling the disengaging operation of the clutch means in dependence on the driving velocity, in which the clutch means is actuated by a pressure medium, spring force means normally seeking to disengage said clutch means, and pressure medium supply means for engaging said clutch means, said control means including discharge valve means controllable in dependence on the driving velocity and arranged in the pressure medium supply means to the clutch means, wherein said control means includes a manually actuated control valve and an electromagnetically actuated control valve arranged in series in said pressure medium supply means.

2. An installation according to claim 1, wherein said electromagnetic control valve includes an energizing winding, said energizing winding being connected with a current source by way of a contact means to be actuated by a speed-responsive means.

3. An installation according to claim 2, wherein the speed-responsive means is a tachometer.

4. An installation for locking a differential gear in vehicles, especially in motor vehicles in which two elements of the differential gear are adapted to be connected with each other by disengageable clutch means, wherein the improvement comprises control means for automatically controlling the disengaging operation of the clutch means in dependence on the driving velocity, wherein said control means includes a manually actuated control valve and an electromagnetically actuated control valve arranged in series in a pressure medium supply means.

5. An installation according to claim 4, wherein said electromagnetic control valve includes an energizing winding, said energizing winding being connected with a current source by way of a contact means to be actuated by a speed-responsive means.

6. An installation according to claim 5, wherein the speed-responsive means is a tachometer.

References Cited

UNITED STATES PATENTS

| | | | |
|---|---|---|---|
| 2,803,149 | 8/1957 | Pringle | 74—710.5 |
| 2,876,658 | 3/1959 | McColl | 74—710.5 |
| 2,991,664 | 7/1961 | Bernotas | 74—711 |
| 3,240,308 | 3/1966 | Frost | 192—104 X |
| 3,292,720 | 12/1966 | Harvey | 74—710.5 X |
| 3,400,610 | 9/1968 | Taylor et al. | 74—710.5 |

ARTHUR T. McKEON, Primary Examiner

U.S. Cl. X.R.

192—104